Aug. 6, 1935.  J. A. SAFFIR  2,010,646
FILM PACKAGE
Filed Nov. 27, 1933
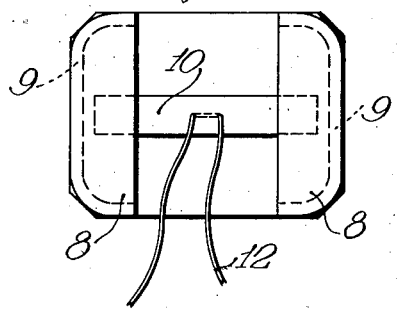
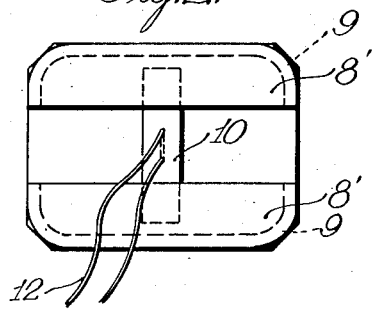
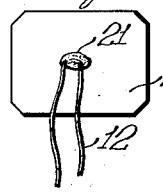
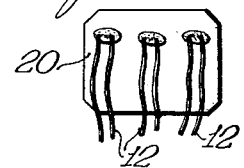
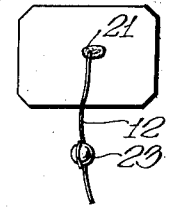
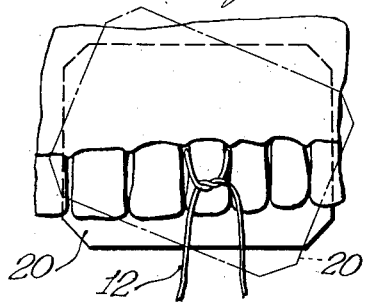
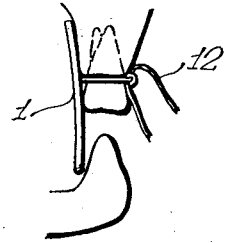
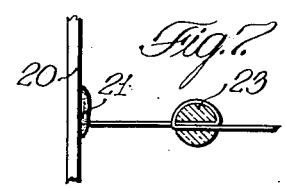
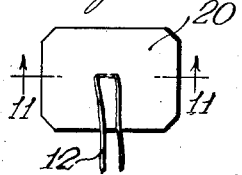
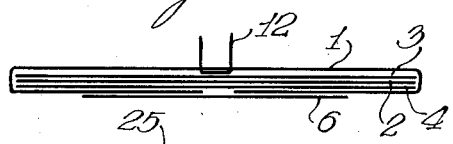
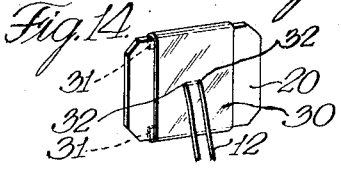
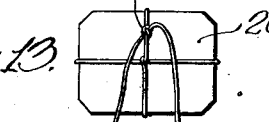
Inventor:
Jacob A. Saffir
By Brown, Jackson, Boettcher & Dienner
Att'ys.

Patented Aug. 6, 1935

2,010,646

UNITED STATES PATENT OFFICE 2,010,646

FILM PACKAGE

Jacob A. Saffir, Rockford, Ill.

Application November 27, 1933, Serial No. 699,832

13 Claims. (Cl. 250—34)

This invention relates to film packages in general, and more particularly to dental X-ray film packages.

It is a primary object of the present invention to provide a dental X-ray film package which can be held in place in the mouth in a simple and expedient manner.

In the taking of an X-ray picture of the teeth it is the usual practice for the operator to place the film in position and then require the patient to hold it in position with his finger. Various devices have been proposed to dispense with this requirement, such as bite blocks, bite wings, etc., but none of them has proven satisfactory, and the finger holding method is still in general use.

In accordance with the teachings of the present invention there is provided an arrangement for securing the film and holding it in place without requiring any active assistance from the patient. I provide means for tying or otherwise securing the film to the teeth. In its simplest embodiment my present invention comprises an ordinary dental X-ray film package to the outer wrapping of which is secured one or more strings of dental floss, dental tape, a fine rubber band, or the like, hereinafter referred to as filaments, which may be passed through the interproximal spaces between adjacent teeth, or tied around a tooth. The film is then held in place with reference to the tooth or teeth to be X-rayed, without requiring any active cooperation of the patient.

My improved film package assures the maintenance of the film in the position in which it is placed by the operator. Where reliance is had upon the patient to hold the film with his finger, as in the present standard practice, there is, very frequently, an appreciable amount of shifting, as during the time the operator's finger is removed and the patient's finger placed in position. Also, in the case of a child, it is practically impossible to obtain an X-ray with any degree of exactness, due to inability of the patient to cooperate or follow instructions. The radiographer can not hold the film in position during exposure because, after a certain number of exposures, his fingers can no longer be exposed to X-rays without great danger to health.

In many cases of trismus, which is a pathological condition that prevents wide opening of the mouth, the film can not be held in position by the finger. This frequently prevents the taking of proper X-ray pictures of the teeth.

Heretofore it has been almost impossible to obtain an X-ray showing the teeth of the upper and lower jaw in normal biting contact, due to the fact that the prior means for holding the film in place for obtaining such a picture depended upon the patient biting on a wing to hold the film in place. The very act of biting throws the teeth out of position a certain amount. By the present invention this difficulty is eliminated. Also, in cases where a patient has an extremely painful sore or elongated tooth, the pain caused by pressure renders it impossible to rely on a bite wing for holding the film in place.

In a case where only upper teeth, or only lower teeth are left, no way was known in the past, insofar as the inventor is aware, whereby an X-ray picture might be obtained to show how closely the mandibular or maxillary bone approximates the occluding surface of the opposite teeth. By my present invention such pictures may readily be obtained.

The attainment of the above and further objects of the present invention will be apparent from the following specification, taken in conjunction with the accompanying drawing forming a part thereof.

In the drawing:

Figure 1 is a front view of a film package embodying the principles of my invention in the form of a slide attached thereto;

Figure 2 shows a modified construction wherein the slide is movable longitudinally, rather than transversely;

Figure 3 is a transverse sectional view through the package of Figure 2 with the wrappings thereof expanded transversely for illustrative purposes;

Figures 4, 5 and 6 show other modifications of my invention;

Figure 7 illustrates the manner of tying the filament of the modification shown in Figure 6;

Figures 8 and 9 are diagrammatic views showing the manner of using packages such as shown in Figures 1 through 6;

Figure 10 is a front view of still another form of my invention;

Figure 11 is a longitudinal section taken along the line 11—11 of Figure 10 and expanded transversely to facilitate illustration; and Figures 12, 13 and 14 illustrate still further modifications of my present invention.

Reference may now be had more particularly to Figures 1, 2 and 3, wherein I illustrate a form of my invention incorporating a movable slide. I have here shown my invention applied to one standard type of dental X-ray film package, although it is to be understood that the invention is applicable to other types of packages. The package is indicated at 1 and comprises the dental X-ray film 2, overlaid by a piece of black paper 3, and underlaid by a piece of lead foil 4, the film, with its overlying and underlying parts, being enclosed in a light-proof paper wrapping 5, the ends of which are secured together by a rectangular piece of paper 6 pasted to the ends 7—7. This much of the package is standard, and may be of any well known construction.

To the opposite ends of the front face of the film package I secure two paper strips or guideways, illustrated at 8—8 in Figure 1 and 8'—8' in Figure 2. The guiding strips are secured in place in any desired manner, as by a line of paste 9 between the edge of the guiding strips and the film package. In the form shown in Figure 1 the guiding strips extend transversely of the package and define transversely extending guides at the opposite ends thereof. In the construction shown in Figure 2 the guiding strips extend longitudinally of the package and define longitudinally extending guideways. A slide 10 is located between the guiding strips 8—8 or 8'—8'. The slide 10 is movable within the guideways defined by the guiding strips, having freedom of angular movement, as well as transverse movement in Figure 1 and longitudinal movement in Figure 2. The length of the slide is appreciably less than the distance between the inner pasted edges 9—9, to allow for longitudinal or transverse shifting of the slide, as well as to allow for freedom of angular movement. The slide comprises a piece of rather stiff, but thin, paper. The frictional engagement between the slide 10 and the upper surface of the film package 1, and between the slide and the guideways 8—8 or 8'—8', is sufficient to hold the slide in any position to which it is moved. A thread 12 is looped through two holes in the slide 10, the free ends of the thread extending outwardly from the slide. The thread 12 may be of any desired material of the requisite strength and thinness. It may comprise a piece of string, dental tape, dental floss, a rubber band, a rubber string, or the like, which will hereinafter be referred to as a filament. In the case of dental floss the thickness of the filament is of the order of 1/100th of an inch.

Reference may now be had more particularly to Figure 8, wherein I show, for illustrative purposes only, one manner of using a film such as is illustrated in Figure 1. The film package is inserted into the mouth in the usual manner to locate it back of the teeth in the region where the picture is to be taken. The ends of the filament 12 are then passed or pulled through the interproximal spaces and then drawn taut and tied together, to secure the slide 10 to the tooth. The film package proper may be moved slight amounts, longitudinally, transversely, or angularly, after the ends of the filament have been drawn taut and tied to the tooth. This permits a precision adjustment of the position of the film package in the mouth, with assurance that it will retain this position during the taking of the picture. Figure 9 shows a sectional view through the mouth, illustrating the way in which the film is held in place. It is to be noted that the film package is flexible and can conform, to a certain degree, to the contour of the portion of the mouth where the film is located. This conformation is obtained when the filaments 12 are drawn taut. In Figure 9 I have illustrated an arrangement wherein there is no lower tooth opposite the upper tooth where the X-ray is being taken. In such instance the use of a bite wing film is out of the question. This figure shows the lower jaw in its normal biting relation to the upper jaw, and illustrates how it is possible to obtain a picture showing how closely the mandibular bone approximates the occluding surface of the upper teeth. The X-ray film is tied to the tooth by means of the filament 12. With my present arrangement it is possible to close the mouth and still retain the film in proper position, it being unnecessary for the patient to maintain his finger in his mouth for holding the film in position.

When the film package is used as in Figure 8 it is not necessary to tie the filament ends 12 to the tooth. The filament ends may be drawn taut in the interproximal spaces and then wedged between teeth wherever there is a tight contact between adjacent teeth.

In Figure 4 I have illustrated another embodiment of my invention. In this embodiment the dental X-ray film package, indicated at 20, comprises any standard type of package. It may be a package such as is illustrated in Figure 3 without the guides 8'—8' and without the slide 10 and its associated filament 12. To this package I secure the filament 12 in any desired manner, as by means of a dab of glue 21 of the kind which is transparent to X-rays. In Figure 4 I have shown the filament 12 secured to the center of the front side of the film package. It is not essential that the filament be located in the center of the film package. It may be adjacent any end of the film package on the front face thereof. Also, while I have shown the two strands of the filament 12 as spaced from one another longitudinally of the film, it is understood that they may be spaced from one another transversely of the film, as indicated in Figure 12.

In Figure 5 I have shown a film with a number of such filaments 12 secured thereto. In this instance I have shown three groups of filaments, although any other suitable number may be used. Also, each one of the three groups of filaments 12 may be replaced by a single strand, so that there will be three or more single strands secured to and extending from the outer face of the film package 20. Such an arrangement has a distinct utility. Obviously, it permits the operator to secure the film to a plurality of teeth and thus cause the film to be flexed more nearly to the shape of the mouth. In the taking of X-ray pictures it is usual to obtain the picture of a number of teeth on the same film. To avoid overlapping, in the obtaining of a complete set of such pictures, it is desirable that the operator consider the teeth of the mouth in five groups and use one film for each group of teeth. Where a single set of filaments 12 is provided, as in Figure 4, it may be difficult to secure the film in position over any one group of teeth, where the tooth that should come directly opposite the bead of glue 21 is missing. This means that there will be a tendency on the part of the operator to shift the film to one side or the other of the position that it should occupy to obtain a picture of the entire preselected group of teeth. This results in overlapping pictures. By using the film package shown in Figure 5 it is possible to secure the film in position by means of any one of the group of filaments 12. Film packages may be made in five different sizes, each for one preselected portion of the oral cavity. By providing each one of the films with a plurality of filaments to permit securing it to any tooth of its group, each film may be located in its desired position in the mouth, even though any one or more teeth of the group being X-rayed is missing.

In Figure 6 I have illustrated an arrangement wherein the filament comprises a single strand or thread 12'. The material is the same as that mentioned for the filament 12 of Figure 1. The filament 12' may be secured to the front face of the film package in any desired manner, as by a dab of radioparent glue 21. A bead 23, of material transparent to X-rays, that is, radioparent material, is strung on the filament 12'; the filament being looped through the bead twice, as indicated in Figure 7. The X-ray film package is placed in the mouth in the usual manner and the filament 12' of dental floss or the like is passed through the interproximal spaces between the teeth. Thereafter the bead 23 is moved along the filament, the filament being drawn taut, to bring it against the outer surface of the teeth. The bead is not easily retracted and will hold the film package in place. The filament 12' may be secured to the film package at the center of the front surface thereof, or at any other part of the front surface. Also, in this case, as in the arrangement shown in Figure 5, a number of such filaments may be used, the operator being provided with beads 23 for use on any of the filaments.

In Figures 10 and 11 I have shown an arrangement wherein the filament 12 extends through two openings in the outer light-proof wrapping 1. The sheet of paper 3 prevents injury of the film by any light that may enter the package through the needle-like openings through which the filament 12 extends. If desired, these openings may be sealed against the entrance of light, as by means of radioparent glue 25 (Figure 12) which is opaque to light. In this connection it is to be noted that the glue 21 used in the modifications illustrated in Figures 4, 5 and 6, need not be transparent, nor necessarily opaque, to light. It is only necessary that it be transparent to X-rays.

Where a film package, such as described above, is to be used horizontally in the mouth, the ends of the filament are spaced longitudinally of the package at the point of attachment thereto. Where the film is to be used vertically in the mouth, the ends of the filament are spaced transversely of the package at the point of attachment. However, either package may be used in either a horizontal or a vertical position, since the filaments are freely twistable into any position.

In Figure 13 I have shown an X-ray film package wherein the filament is merely wrapped around the package and knotted in place, with the ends of the filament extending outwardly from the knot. The filament, of dental floss or the like, is wound around the film package, once longitudinally and once transversely, although it is to be understood that either the longitudinal loop or the transverse loop, alone, will suffice. The filament may be shifted along the film package to bring the knot 25, from which the loose ends of the filament extend, into any desired location along the front surface of the film package, thus positioning the film in any desired relation to the tooth being radiographed.

If desired, I may secure the string or filament to a clip which may be snapped over a standard dental film package. The clip is made of suitable material transparent to X-rays. In Figure 14 I have shown such clip at 30, secured to a standard dental X-ray film package. The clip is made of celluloid, or other springy radioparent material. The edges of the clip are bent back, as indicated at 31, and maintain a spring pressure between the film package and the clip. The filament 12, of dental floss or the like, as previously set forth, is threaded through two holes 32 in the clip 30. Additional holes, such as indicated at 32, may be provided so that the filament 12 may be located closer to either longitudinal edge of the film package, as may be required. Also, the holes 32 may be replaced by a pair of slots, through which the filament is extended, thus giving vertical adjustability of the filament with respect to the film when the film is in the mouth, as well as the horizontal adjustability that results by sliding the clip along the film package. If desired, the bent back edges 31 may be omitted, the clip then constituting a flat plate-like member which may be removably secured to the package by means of a pair of rubber bands or the like.

While I have herein shown a number of preferred embodiments of my invention, it is to be understood that the invention is not limited to any of the specific embodiments shown, the same being merely illustrative of the principles of the invention.

What I consider new and desire to secure by Letters Patent is:

1. A film package comprising a substantially flat film, a light-proof wrapping therefor, and a filament secured to the wrapping and extending outwardly from the side thereof over the sensitive side of the film, for mounting the film package in picture taking position.

2. An X-ray film package of wafer form comprising a substantially flat film, a lead foil backing therefor, a light-proof wrapping, and a filament secured to the package and extending outwardly therefrom for mounting the package in picture taking position.

3. An X-ray film package having a filament extending therefrom and a radioparent means on the filament for securing the package to a tooth.

4. An X-ray film package of wafer form for insertion into the mouth, said package being light-proof and moisture proof, and a thread shaped member secured to the outer surface of the package and extending outwardly therefrom at a point spaced a substantial amount from the edges of the package.

5. In combination, a dental X-ray film package of wafer form to permit insertion into the mouth, and means extendable through the interproximal spaces between the teeth for securing the film in picture taking position in the mouth.

6. In combination, a dental X-ray film package of wafer form to permit insertion into the mouth, and means for ligating the film package to the teeth.

7. A dental X-ray film package having a plurality of thread shaped members glued to the outer front surface thereof for mounting the package in picture taking position.

8. A dental X-ray film package of wafer form to permit insertion into the mouth, and an attachment thereto comprising a thin radioparent member removably secured over the front face of the film package and adapted to bear against the teeth when the package is in picture taking position in the mouth, said radioparent member including means passable through the interproximal spaces between the teeth for securing it to the teeth in picture taking position, the film package being adjustable with respect to the radioparent member when the radioparent member is secured to the teeth.

9. A dental X-ray film package adapted to be inserted into the mouth and be ligated to the teeth in picture taking position, said package being of wafer form to permit insertion into the mouth and including an X-ray film and a light proof radioparent wrapping, and means for ligating the package to a tooth, comprising at least one thread shaped filament member insertable in the interstices between teeth, for holding the package firmly against the teeth in proper picture-taking position.

10. In combination, a dental X-ray film package, and means for securing it to the teeth of a patient along the sides of the teeth and entirely outside of the space between the teeth of the upper and lower jaws, thereby permitting normal closure of the teeth while the film package is held in normal picture-taking position.

11. A dental X-ray film package having a lightproof wrapping, and means on the outside thereof for mounting the package in picture-taking position comprising at least one thread-shaped member for securing the package to a tooth.

12. A dental X-ray film package of wafer form to permit insertion into the mouth, and means including a slide carried by the package for ligating the film to the teeth in picture-taking position, said slide being adjustable with respect to the package and said package being angularly adjustable within the mouth after ligation to the teeth.

13. An X-ray film package of wafer form to permit insertion into the mouth, a slide secured to the package, said slide being free to slip angularly along the outer surface of the package to permit angular adjustment of the slide with respect to the package while the slide remains secured to the package, and means carried by the slide for holding the film package in the mouth, said holding means being in a position out of interference with normal biting action.

JACOB A. SAFFIR.